United States Patent
Anick et al.

(10) Patent No.: US 6,947,930 B2
(45) Date of Patent: Sep. 20, 2005

(54) SYSTEMS AND METHODS FOR INTERACTIVE SEARCH QUERY REFINEMENT

(75) Inventors: Peter G. Anick, Marlboro, MA (US); Alastair Gourlay, Boulder Creek, CA (US); John Thrall, Fremont, CA (US)

(73) Assignee: Overture Services, Inc., Pasadena, CA (US)

( * ) Notice: Subject to any disclaimer, the term of this patent is extended or adjusted under 35 U.S.C. 154(b) by 0 days.

(21) Appl. No.: 10/424,180

(22) Filed: Apr. 25, 2003

(65) Prior Publication Data

US 2004/0186827 A1 Sep. 23, 2004

Related U.S. Application Data

(60) Provisional application No. 60/456,905, filed on Mar. 21, 2003.

(51) Int. Cl.[7] ............................................. G06F 17/30
(52) U.S. Cl. ........................... 707/5; 707/100; 707/102; 715/513
(58) Field of Search ................................. 707/2–5, 100, 707/101, 102, 104.1, 9, 10; 715/500, 501.1, 513

(56) References Cited

U.S. PATENT DOCUMENTS

| | | | | |
|---|---|---|---|---|
| 5,278,980 A | | 1/1994 | Pedersen et al. ................ 707/4 |
| 5,675,819 A | * | 10/1997 | Schuetze ..................... 704/10 |
| 5,771,378 A | * | 6/1998 | Holt et al. ...................... 707/5 |
| 5,787,421 A | | 7/1998 | Nomiyama .................... 707/5 |
| 5,926,811 A | * | 7/1999 | Miller et al. ................... 707/5 |
| 5,933,822 A | * | 8/1999 | Braden-Harder et al. ....... 707/5 |
| 5,987,457 A | | 11/1999 | Ballard .......................... 707/5 |
| 6,014,665 A | | 1/2000 | Culliss .......................... 707/5 |
| 6,018,733 A | * | 1/2000 | Kirsch et al. .................. 707/3 |
| 6,044,365 A | | 3/2000 | Cannon et al. ................ 707/2 |
| 6,067,552 A | * | 5/2000 | Yu ........................... 715/501.1 |
| 6,128,613 A | * | 10/2000 | Wong et al. ................... 707/7 |
| 6,154,737 A | * | 11/2000 | Inaba et al. .................... 707/3 |
| 6,282,538 B1 | * | 8/2001 | Woods .......................... 707/5 |
| 6,363,378 B1 | | 3/2002 | Conklin et al. ................ 707/5 |
| 6,411,950 B1 | | 6/2002 | Moricz et al. ................. 707/3 |
| 6,480,843 B2 | | 11/2002 | Li .................................. 707/5 |
| 6,507,841 B2 | | 1/2003 | Riverieulx de Varax ....... 707/5 |
| 6,594,658 B2 | * | 7/2003 | Woods .......................... 707/5 |

OTHER PUBLICATIONS

Anick and Tipirneni; *The Paraphrase Search Assistant: Terminological Feedback for Iterative Information Seeking*; SIGIR (1999); pp. 153–161.

Bruza et al.; *Interactive Internet Search: Directory and Query Reformulation mechanisms Compared*; Proceedings of the SIGIR Conference, 2000.

(Continued)

*Primary Examiner*—Greta Robinson
*Assistant Examiner*—Cheryl Lewis
(74) *Attorney, Agent, or Firm*—Brown Raysman Millstein Felder & Steiner LLP (57) ABSTRACT

A received query is processed so as to generate an initial group of ranked documents corresponding to the received query. Each document in all or a portion of the documents in the initial group of ranked documents is associated with a respective set of ranked candidate terms such that each candidate term in the respective set of ranked candidate terms is embedded within the document. Each respective set of ranked candidate terms is identified at a time prior to the processing of the received query. In accordance with a selection function, a subset of the candidate terms in one or more of the respective sets of candidate terms is selected. In response to the received query, the initial group of ranked documents and the subset of candidate terms are presented.

75 Claims, 4 Drawing Sheets

OTHER PUBLICATIONS

Bruza and Dennis; *Query Reformulation on the Internet: Empirical Data and the Hyperindex Search Engine*; Proceedings of the RIAO97 Conference—Computer–Assisted Information Searching on Internet, Centre de Hautes Etudes Internationales d'Informatique Documentaires, Jun., 1997.

Chen and Dhar; *Online Query Refinement on Information Retrieval Systems: A Process Model of Searcher/System Interactions*; Proceedings of the Thirteenth Annual International ACMSIGIR Conference on Research & Development in Information Retrieval, Brussels, ACM Press, (1992) 115–133.

Efthimiadis; *Interactive Query Expansion: A User–based Evaluation in a Relevance Feedback Environment*; Journal of the American Society for Information Science, 51 (11), 989–1003, 2000.

Efthimiadis; *User Choices: A New Yardstick for the Evaluation of Ranking Algorithms for Interactive Query Expansion*; Information Processing & Management; vol. 31 (1995); pp. 605–620.

Joho et al; *Hierarchical Presentation of Expansion Terms-*SAC (2002); pp. 645–649.

Jones and Staveley; *Phrasier: A system for Interactive Document Retrieval Using Keyphrases*; In Hearst, Marti, Fredric Gey and Richard Tong (eds). Proc 22nd International Conference on Research and Development in Information Retrieval (SIGIR'99), Berkeley, USA, Aug., 1999, p 160–167. ACM.

McArthur and Bruza; *The Ranking of Query Refinements in Interactive Web–based Retrieval*; Proceedings of the Information Doors Workshop (held in conjunction with the ACM Hypertext and Digital Libraries Conferences), 2000.

Yuen–Hsien Tseng; *Multilingual Keyword Extraction for Term Suggestion*; SIGIR (1998); pp. 377–378.

Yuen–Hsien Tseng; *Solving Vocabulary Problems with interactive Query Expansion*; Solving Vocabulary Problems with Interactive Query Expansion; Journal of Library Information Science, vol. 24, No. 1, Arp., 1998, pp. 1–18.

Vélez et al.; *Fast and Effective Query Refinement*; SIGIR (1997); pp. 6–15.

Weiss et al.; *HyPursuit: A Hierarchical Network Search Engine that Exploits Content–Link Hypertext Clustering*; Proceedings of the Seventh ACM Conference on Hypertext, Washington, DC, Mar. 1996.

Xu and Croft; *Query Expansion Using Local and Global Document Analysis*; SIGIR (1996); pp. 4–11.

Zamir and Etzioni; *Web Document Clustering: A Feasibility Demonstration*; SIGIR (1998); pp. 46–54.

*Indexing by Latent Semantic Analysis*, Deerwester, et al., 1990, pp. 1–33.

*The INQUERY Retrieval System*, Callan, et al., 1992, pp. 1–9.

*Query Expansion Using Local and Global Document Analysis*, Xu, et al., 1996, pp. 1–8.

*Publication Query Results*, http://ciir.cs.unmass.edu/cgi-bin/irdemo/pubdb_scripts/oldsearch_pub.pl, Dec. 11, 2003, pp. 1–3.

* cited by examiner

SYSTEMS AND METHODS FOR INTERACTIVE SEARCH QUERY REFINEMENT

This application claims priority to U.S. patent application Ser. No. 60/456,905 entitled "Systems and Methods For Interactive Search Query Refinement" filed Mar. 21, 2003, which is hereby incorporated by reference in its entirety.

FIELD OF THE INVENTION

The present invention relates to the field of search engines, such as search engines for locating documents in a database or documents stored on servers coupled to the Internet or in an intranet, and in particular the present invention relates to systems and methods for assisting search engine users in refining their search queries so as to locate documents of interest to the users.

BACKGROUND OF THE INVENTION

Developing search expressions that both convey a user's information need and match the way that need is expressed within the vocabulary of target documents has long been recognized as a difficult cognitive task for users of text search engines. A large majority of search engine users begin their search for a document with a query having only one or two words, and are then disappointed when they do not find the document or documents they want within the first ten or so results produced by the search engine. While user satisfaction can be improved, at least for some searches, by improving the manner in which results are ranked, very broad search queries cannot satisfy the more specific information desires of many different search engine users. One way to help a user refine a query expression is to offer term suggestions, just as a librarian might do so in a face-to-face interaction with an information seeker. Doing this automatically, however, is quite different, since the system must "guess" which terms, out of hundreds that may be conceptually related to a query, as most likely to be relevant to users conducting a search. Common approaches for choosing related terms include consulting an online thesaurus or a database of prior logged queries (that can be searched to find previous queries that contain one or more words in the current query). A weakness of such approaches is that there is no guarantee that the related terms so generated actually reflect the subject matter or vocabulary used within the corpus of documents itself. For this reason, alternative approaches that attempt to glean related terms dynamically from the actual results of a query have received much interest.

Some prior approaches that use a search result set to generate refinement suggestions include term relevance feedback (e.g. Vélez et al., Fast and Effective Query Refinement, in Proceedings of SIGIR'97, pp. 6–15), Hyperindex (Bruza and Dennis, Query Reformulation on the Internet: Empirical Data and the Hyperindex Search Engine, in Proceedings of RIAO'97, pp. 500–509), Paraphrase (Anick and Tipirneni, The Paraphrase Search Assistant: Terminological Feedback for Iterative Information Seeking, in Proceedings of SIGIR'99, pp. 153–159) and clustering (Zamir and Etzioni, Web Document Clustering: A Feasibility Demonstration, in Proceedings of SIGIR'98, pp. 46–54). Most relevance feedback methods have been designed for partial match search engines and typically involve broadening a query expression by the addition of multiple weighted terms derived from computations over a subset of retrieved documents explicitly tagged as relevant or non-relevant by a user. Hyperindex runs a syntactic analyzer over snippets returned by a search engine to extract noun phrases that contain the query term. Paraphrase extracts noun phrases from result set documents and chooses feedback terms to display based on lexical dispersion. Clustering approaches attempt to cluster result set snippets and derive representative query terms from the terms appearing within the respective clusters. While many of these approaches are functional, they are somewhat unsatisfactory for very large web search engines, either for reasons of runtime performance or relevance of feedback terms generated. There remains a need in the art for effective methods for assisting a user in identifying relevant search terms to improve a search.

To better understand the limitations of the prior art, a closer review of Vélez et al., Fast and Effective Query Refinement, in Proceedings of SIGIR'97, pp. 6–15, is warranted. Vélez et al. provides a system and method for query refinement in which terms from automated suggestions are added to an initial query in order to refine the initial query. In Vélez et al., the authors build upon the generic query refinement program DM. As put forth in Vélez et al., DM has the following steps:

Let

C=document corpus q=user query r=number of matching documents to consider $W_{fcn}(S)$=algorithm specific weight term set S Then, 1. Compute the set of documents $D(q) \in C$ that match the query q.
2. Select a subset $D_r(q)$ of top r matching documents
3. Compute the set of terms T(q) from the documents $D_r(q)$ such that $T(q)=\{t | \exists d \in D_r(q): t \in d\}$ where d is a document and t is a term.
4. Compute the subset S of n terms from T(q) with the highest weight $W_{fcn}(S)$.
5. Present S to the user as the set of term suggestions.

As noted in Vélez et al., this approach is unsatisfactory because it is an expensive run time technique. In other words, it will take an unsatisfactory amount of time to compute the set of term suggestions S using DM in cases where the document database (corpus) is large.

Vélez et al. seeks to improve on the speed of DM by precomputing a substantial amount of the work that is done dynamically by DM. In this precomputation phase, Vélez et al. generates a data structure that maps each single-word term t in the corpus to a respective set of terms m that the DM algorithm would suggest given the single term query t. Then, at run-time, an arbitrary query is received from the user. The query typically comprises a set of terms. In response to the query, Vélez et al. collects the respective sets of terms m corresponding to each of the terms in the query and merges each of these sets into a single set that is then returned to the user as suggestions for an improved search. For example, consider the case in which the user enters the query "space shuttle". In this instance Vélez et al. could obtain the set of terms m that have been precomputed for the word "space" and the set of terms m that have been precomputed for the word "shuttle" and will merge them together in order to derive a set of suggested terms for the query "space shuttle".

While this approach improves runtime performance by precomputing a subset of term relationships off-line, the Vélez et al. approach has drawbacks. First, there is a context problem. The Vélez et al. approach relies on the assumption that the set of terms m relevant to a given term t is the same regardless of whether the term t appears by itself or as part of a multi-term query. However, this is assumption is not always true. A term appearing within a multi-term phrase can in some instances express a completely different meaning relative to the term appearing by itself. Because of the underlying assumption in Vélez et al., the approach can potentially lead to inappropriate search term suggestions in some instances or else miss other suggestions that would be more relevant within the context of the entire query. Second, when the corpus (document database) changes, the Vélez et al. approach requires that sets of terms m respectively associated with terms t in the corpus be recomputed because each set of terms m depends on the contents of a plurality of files in the corpus including, possibly, files that have recently been added to the corpus.

Xu and Croft, SIGIR'97, pp. 4–11 describe another approach in which sets of terms that are related to a given concept are precomputed before a search query, which may include several concepts (search terms), is received. Like the Vélez et al. approach, the Xu and Croft methods relies on the construction of static cross document data structures and statistics that necessitate extensive recomputation of terms associated with concepts as the corpus changes over time. Accordingly, the computational demands of Xu and Croft are unsatisfactory for very large, dynamic document databases.

Given the above background, it would be desirable to provide assistance to users in refining their search queries into more narrowly defined queries, so as to produce search results more to their liking.

SUMMARY OF THE INVENTION

The present invention provides an improved method for refining a search query that is designed to retrieve documents from a document index. The present invention is advantageous because it does not rely on cross document data structures or global statistics that must be recomputed each time the corpus is updated. Further, the present invention requires significantly less I/O resources at query time (run time) because fewer results need to be fetched at run time than in known methods to produce a short list of relevant suggestions that includes a mix of phrases, single word terms, and specializations (phrases including a query term). In the present invention, each document in the document index is processed at some time prior to the query, for example during the generation of the document index. In this processing, each document in the document index is examined to determine if the document includes any terms suitable for inclusion in a set of ranked candidate terms for the document. When the document includes such terms, the document index entry for the document is configured to include a set of terms associated with the document. This set of terms is called a set of ranked candidate terms.

When a query is received, an initial group of documents are retrieved from the document index. The initial group of documents is ranked by relevance to the query. The "initial group" of documents can be a subset of the full set of documents identified as being potentially relevant to the query. In one embodiment, the number of documents in the initial group is the lesser of all the documents identified as being potentially relevant to the query and a parameter value, typically between 20 and 200 (e.g., 50). Next, a weighting function is applied to each candidate term that appears in any set of ranked candidate terms that is associated with a document in the initial group of ranked documents. Top scoring candidate terms are presented, in response to the query, along with the initial group of ranked documents. User selection of one of the presented candidate terms results in the addition of the term to the original search query.

One aspect of the invention provides a method of refining a received query. The received query is processed so as to generate an initial group of ranked documents corresponding to the received query. Each document in all or a portion of the documents in the initial group of ranked documents is associated with a respective set of ranked candidate terms. Each candidate term in the various respective sets of candidate terms is embedded within a document in the initial group of ranked documents. Each candidate term can be a word or a phrase. Furthermore, in a preferred embodiment, the various respective sets of candidate terms are constructed at a time prior to processing the received query. The method continues with the selection of a subset of candidate terms that are in one or more of the various respective sets of ranked candidate terms. A selection function is used to select this subset of candidate terms. Then, in response to the received query, the initial group of ranked documents and the subset of candidate terms are presented. In some embodiments, the processing, selecting, and presenting is repeated using a revised query that includes the original received query and a candidate term from the subset of candidate terms.

In some embodiments, a set of candidate terms associated with a document is constructed by comparing a term in the document to a master list of candidate terms. When the term is in the master list of candidate terms, the term is added to the set of candidate terms associated with the document as a candidate term. In some embodiments, the master list of candidate terms includes more than 10,000,000 candidate terms. This comparing is repeated until a maximum number of terms in the document has been considered or a threshold number of unique terms has been considered. Then a weighting and/or selection function is applied to the set of candidate terms to produce a set of ranked candidate terms. Typically, this weighting and/or selection function ranks the candidate terms and then applies a cutoff in which only high ranked terms are retained. In some embodiments, the master list of candidate terms is optimized for a specific language (e.g., English, Spanish, French, German, Portuguese, Italian, Russian, Chinese, or Japanese). In some embodiments, each document in all or a portion of the documents in the initial group of ranked documents is in the same language for which the master list of candidate terms has been optimized.

In some embodiments, each document in a document index is classified at a time prior to the query process (e.g., during initial document indexing). In some embodiments, there are two possible classes, a first family friendly class and a second non-family friendly class. A designation of the classification of the document is included in the document index.

In some embodiments a single-word candidate term in a set of ranked candidate terms that is in fact a subset (substring) of a more complex term in the set of ranked candidate terms is discarded. Further, the more complex term is given credit for the number of instances the simpler term appeared in all or the upper portion of the document associated with the set of ranked candidate terms. This discarding and crediting is repeated until there is no single-word candidate term that is a subset of a more complex candidate term in the set of ranked candidate terms. Furthermore the same procedure may be applied to multi-word candidate terms that are subsets of more complex terms.

In some embodiments a candidate term in a set of ranked candidate terms that is an orthographic or inflectional variant of a second term in the set of ranked candidate terms is discarded. Further, the second term is given credit for the number of instances the orthographic or inflectional variant term appeared in all or the upper portion of the document associated with the set of ranked candidate terms. This discarding and crediting is repeated until there is no term that is an orthographic or inflectional variant of another term in the set of ranked candidate terms. In some instances, the second term is rewritten in the candidate set as a combined term that includes both (e.g., multiple) orthographic or inflectional variants, with the variant that appeared most in all or an upper portion of the associated document appearing first in the combined term. In some embodiments, when the combined term is selected for inclusion in the subset of candidate terms presented, only the first portion of the combined term is presented to the user.

Some embodiments of the present invention provide various selection functions that are used to select the subset of candidate terms to be presented in response to a query. In some embodiments, this selection function takes advantage of the information that is found in the sets of candidate terms associated with top-ranked documents in the initial group of ranked documents. This information includes two forms of ranking. First, the documents are ranked. Second, each candidate term in each set of ranked candidate terms associated with a document in the initial group of ranked documents is ranked.

In one embodiment, the selection function comprises: (i) applying a weighting function to each candidate term in each respective set of ranked candidate terms that is associated with a top-ranked document in the initial group of ranked documents. As used herein, each top-ranked document in the initial group of ranked documents is a document that has a rank that is numerically less than some threshold ranking (e.g. 50, that is, the top-ranked document is in the top 50 documents in the initial group of ranked documents returned for the query). For example, consider the case in which the initial group of ranked documents includes 100 documents and the threshold ranking is fifty. Then, the first fifty documents will be considered top-ranked documents. Those candidate terms receiving a highest weight are included in the subset of candidate terms that are presented along with the query results. In some embodiments, the weight that is applied to a candidate term by the weighting function is determined in accordance with a number of sets of candidate terms associated with top-ranked documents that the candidate term appears in, the average position of the candidate term in each such set of ranked candidate terms, by whether a term in the received query is in the candidate term, by a number of characters in the candidate term, or by the average rank position of the top-ranked documents that include the term in an associated set of candidate terms. In some embodiments, the weight that is applied to a candidate term by the weighting function is determined in accordance with any combination or any weighted subset of TermCount, TermPosition, ResultPosition, TermLength, and QueryInclusion, where TermCount is the number of sets of ranked candidate terms that both (i) include the candidate term and (ii) are respectively associated with a top-ranked document, TermPosition is a function (e.g., an average) of the position of the candidate term in those sets of ranked candidate terms that both (i) include the candidate term and (ii) are respectively associated with a top-ranked document, ResultPosition is a function (e.g., an average) of the rank of those top-ranked documents that are associated with a set of ranked candidate terms that includes the candidate term, TermLength is a number of characters in the candidate term (candidate term complexity), and QueryInclusion is a value that indicates whether a term in the received query is in the candidate term.

In some embodiments, the weight that is applied to a candidate term by the weighting function is determined in accordance with the formula:

TermCount+TermPosition+ResultPosition+TermLength+QueryInclusion.

In some embodiments, TermCount, TermPosition, ResultPosition, TermLength, and QueryInclusion are each independently weighted. In some embodiments, the weight that is applied to a candidate term by the weighting function is determined in accordance with the formula:

(TermCount*$w_1$)+(TermPosition*($w_2$+(RefinementDepth*$w_2'$)))+
(ResultPosition*$w_3$)+(TermLength*($w_4$+
(RefinementDepth*$w_4'$)))+(QueryInclusion*($w_5$+
(RefinementDepth*$w_5'$)))

where $w_1$, $w_2$, $w_3$, $w_4$, $w_5$, $w_2'$, $w_4'$, and $w_5'$ are independent weights and RefinementDepth is a number of times said processing has been performed for said received query.

In some embodiments, the selection function comprises determining, for each document in the initial group of ranked documents, the classification of the document. Then, when a threshold percentage of the set of documents belong to a first classification (e.g., a family friendly category), all sets of ranked candidate terms that belong to documents that are members of a second classification (e.g., a non family friendly category) are not used to form the subset of candidate terms.

Another aspect of the invention provides a computer program product for use in conjunction with a computer system. The computer program product comprises a computer readable storage medium and a computer program mechanism embedded therein. The computer program mechanism comprises a query refinement suggestion engine for refining a received query. The engine comprises instructions for processing the received query so as to generate an initial group of ranked documents corresponding to the received query. Each document in all or a portion of the documents in the initial group of ranked documents is associated with a respective set of ranked candidate terms such that each candidate term in the respective set of ranked candidate terms is embedded within the document. Each respective set of ranked candidate terms is identified at a time prior to the processing of the received query. The engine further comprises instructions for selecting, in accordance with a selection function, a subset of candidate terms that are in one or more of the respective sets of candidate terms. Further, the engine comprises instructions for presenting, in response to the received query, the initial group of ranked documents and the subset of candidate terms.

Still another aspect of the present invention provides a document index data structure comprising a plurality of uniform resource locators (URLs). Each URL designates a respective document. Each document in all or a portion of the respective documents designated by the plurality of URLs is associated with a respective set of ranked candidate terms. Each candidate term in a respective set of ranked candidate terms comprises candidate terms that are embedded in the document associated with the set of ranked candidate terms. Furthermore, these candidate terms are ranked by a weighting function. In some embodiments, a respective set of ranked candidate terms is created by (A) comparing a term in the document associated with the respective set of ranked candidate terms to a master list of candidate terms, wherein, when the term is in the master list of candidate terms, the term is added to the respective set of ranked candidate terms as a candidate term;

(B) repeating the comparing until a maximum number of terms in the document has been considered;

(C) ranking the candidate terms in accordance with a weighting function thereby forming the ranked candidate terms.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

Like reference numerals refer to corresponding parts throughout the several views of the drawings.

DESCRIPTION OF THE PREFERRED EMBODIMENTS

In a typical embodiment, the present invention generates, in an efficient manner, a small set (10–20) of query refinement suggestions (subset of candidate terms) that are potentially highly relevant to a user's query and reflect the vocabulary of target documents.

Figure 1:
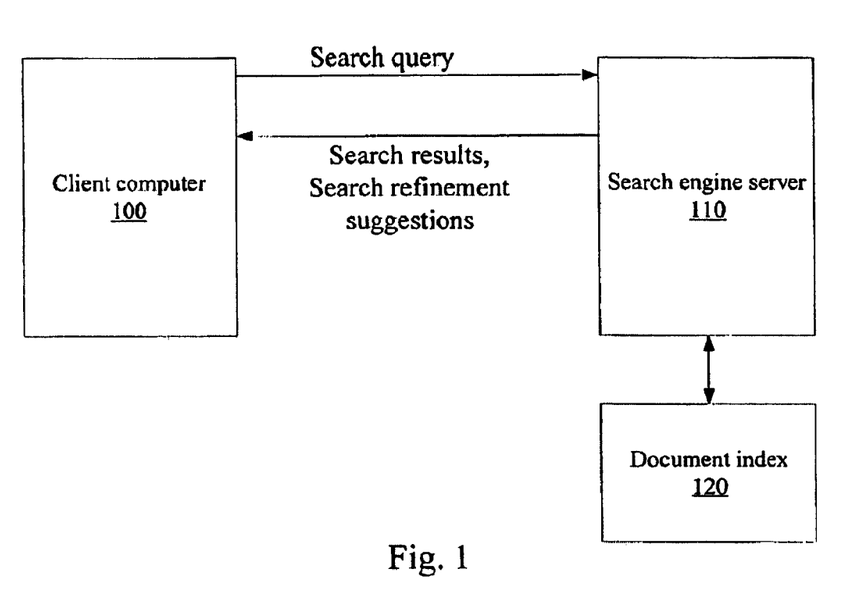
FIG. 1 illustrates a client computer submitting a query to a search engine.

As shown in FIG. 1, a search query is submitted by a client computer 100 to a search engine server 110. Upon receiving the search query, search engine server 110 identifies documents in document index 120 that are relevant to the search query. Further, search engine server 110 ranks the relevant documents by, for example, their relevance to the search query among other ranking factors. A description of this group of ranked documents (search results) is then returned to client computer 100 as a group of ranked documents. In the present invention, additional information, in the form of a subset of candidate terms (search refinement suggestions), is returned to the client computer along with the initial group of ranked documents.

Figure 2:
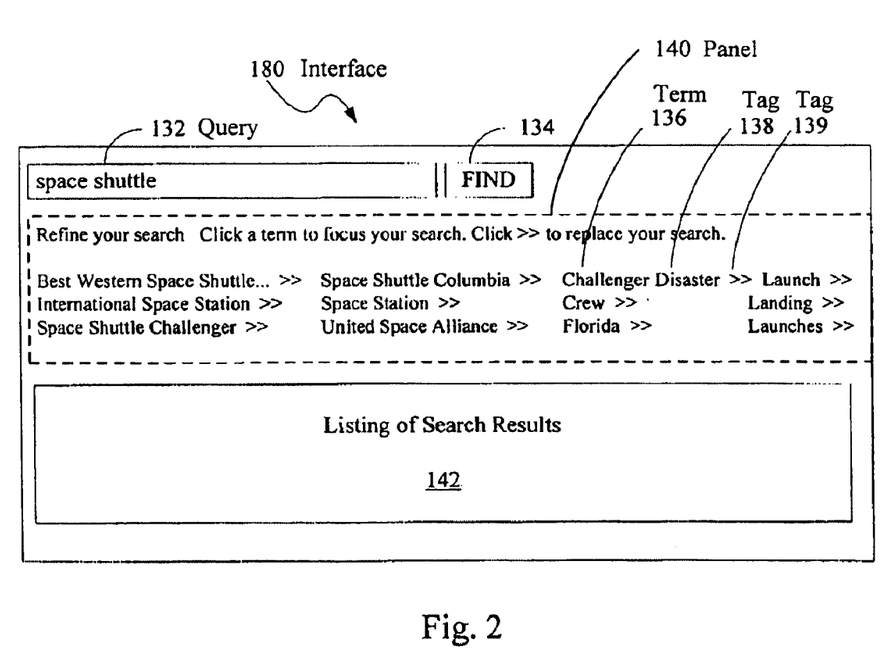
FIG. 2 illustrates a search results page, including query refinement suggestions, produced in accordance with an embodiment of the present invention.

Before turning to details on how server 110 generates the subset of candidate terms, a screen shot of search results and search refinement suggestions returned by an embodiment of search engine server 110 is provided as FIG. 2 so that the advantages of the present invention can be better understood. In FIG. 2, a user provides an initial query (a received query) 132. When find button 134 is pressed, query 132 is sent from client computer 100 to search engine server 110. Upon receiving query 132, search engine server 110 processes received query 132 and sends search results and search refinement suggestions back to client computer 100 in the form of an initial group of ranked documents and a subset of candidate terms. The subset of candidate terms is displayed in panel 140 of interface 180. Specifically each term 136 in the subset of candidate terms is displayed in region 140 along with a tag 138. Concurrently, a listing of search results (top-ranked documents in an initial list of ranked documents) is displayed in panel 142. The systems and methods of the present invention are directed towards identifying terms 136 that can narrow, change or improve the original query 132. When the user presses a tag 138, the term 136 that corresponds to the tag 138 is added to initial query 132 and the whole process repeats with the new query. When the user presses another tag 139, the term 136 that corresponds to the tag 138 replaces the initial query 132 and the search engine server processes that term 136 as a new query. In embodiments not shown, one or more additional tags corresponding to each term 136 can be added to the panel 140. In one example, there is a tag that is used to add the corresponding term 136 to an exception list. To illustrate, when the original query is "A" and the user presses the exclusion tag for the term "B", the new query becomes "A" and not "B". In addition to the subset of terms displayed in panel 140, the initial group of ranked documents is displayed in panel 140. To save bandwidth between computer 100 and server 110, in typical embodiments, the initial group of ranked documents typically only includes an indicia of each document in the initial group of ranked documents so that the user can determine the nature of each of the documents in the initial ranked documents. Such indicia is still referred to herein as an initial group of ranked documents.

An overview of the systems and methods of the present invention has been disclosed. From this overview, the many advantages and features of the present invention are apparent. The novel algorithms of the present invention automatically provide a user with a list of suggested terms 136 that can be used to improve an initial query. For example, in FIG. 2, the initial query 132 is "space shuttle". In response to this initial query, an embodiment of the present invention provides a subset of candidate terms that includes terms 136 such as "Challenger Disaster". Addition of the term "Challenger Disaster" to the initial query or replacement of the initial query with the term "Challenger Disaster" provides the user with a query that quite possibly more closely matches the interests of the user. By using the novel subset of candidate terms, a user can build an improved query without analyzing documents (or indicia thereof) within the initial group of ranked documents. Thus, using the present invention, there is no longer a need to determine why an initial query produced too many (or too few) results or results that are not directly related to the informational needs of the user.

Figure 3:
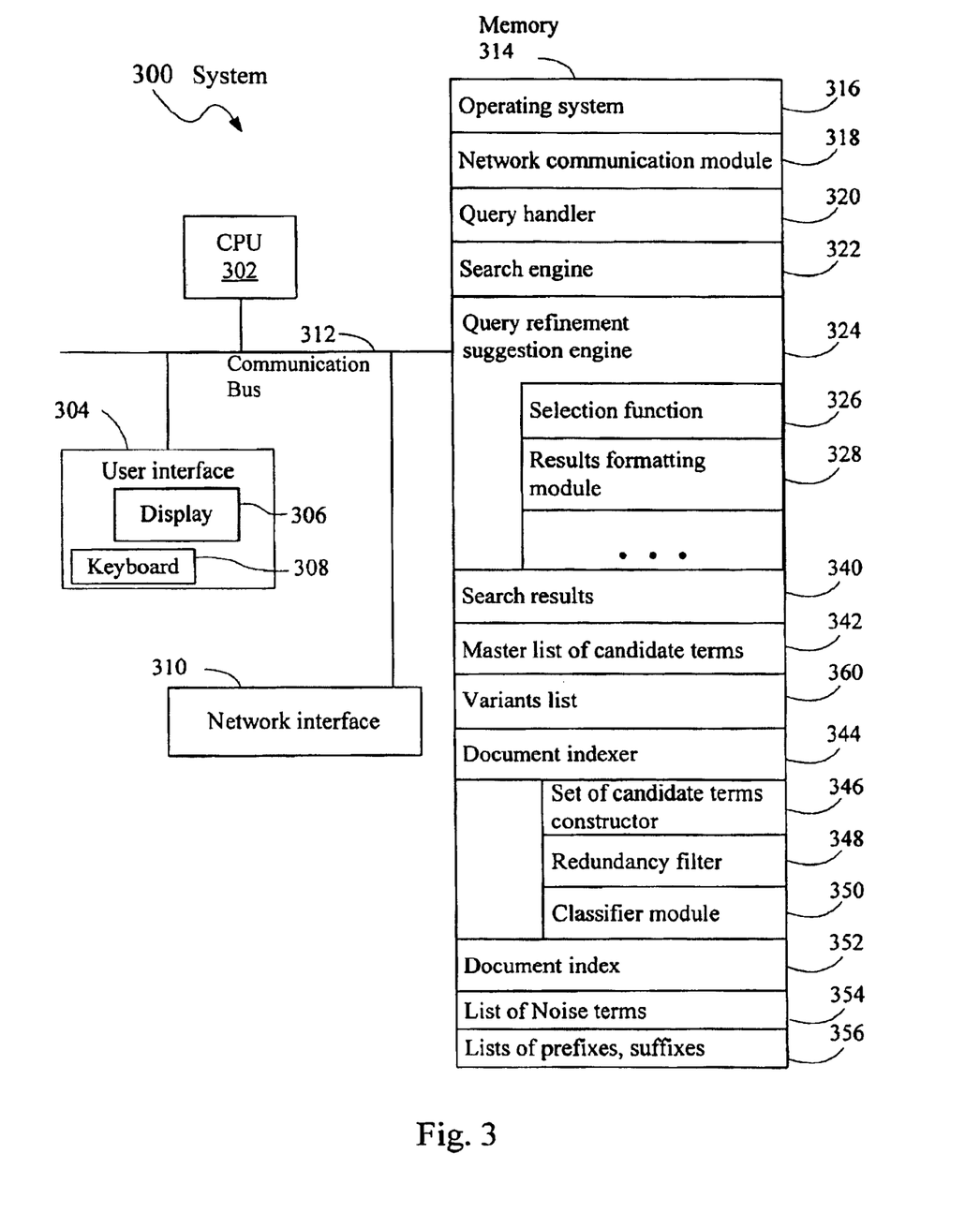
FIG. 3 is a block diagram of a search engine server.

Now that an overview of the invention and advantages of the present invention have been presented, a more detailed description of the systems and methods of the present invention will be disclosed. To this end, FIG. 3 illustrates a search engine server 110 in accordance with one embodiment of the present invention. In a preferred embodiment, the search engine server 110 is implemented using one or more computer systems 300, as schematically shown in FIG. 3. It will be appreciated by those of skill in the art, that search engines designed to process large volumes of queries may use more complicated computer architectures than the one shown in FIG. 3. For instance, front end set of servers may be used to receive and distribute queries among a set of back end servers that actually process the queries. In such a system, the system 300 shown in FIG. 3 would be one of the back end servers.

The computer system 300, will typically have a user interface 304 (including a display 306 and a keyboard 308), one or more processing units (CPU's) 302, a network or other communications interface 310, memory 314, and one or more communication busses 312 for interconnecting these components. Memory 314 can include high speed random access memory and can also include non-volatile memory, such as one or more magnetic disk storage devices (not shown). Memory 314 can include mass storage that is remotely located from the central processing unit(s) 302. The memory 314 preferably stores:

- an operating system 316 that includes procedures for handling various basic system services and for performing hardware dependent tasks;
- a network communication module 318 that is used for connecting the system 300 to various client computers 100 (FIG. 1) and possibly to other servers or computers via one or more communication networks, such as, the Internet, other wide area networks, local area networks (e.g., a local wireless network can connect the client computers 100 to computer 300), metropolitan area networks, and so on;
- a query handler 320 for receiving a query from a client computer 100;
- a search engine 322 for searching a document index 352 for documents related to a query and for forming an initial group of ranked documents that are related to the query; and
- a query refinement suggestion engine 324, for implementing many aspects of the present invention.

Query refinement suggestion engine 324 can include executable procedures, sub-modules, tables and other data structures. In one embodiment, refinement suggestion engine 324 includes:

- a selection function 326 for identifying a subset of candidate terms for presentation in conjunction with an initial group of ranked documents; and
- a results formatting module 328 for formatting the subset of candidate terms and the initial group of ranked documents for presentation.

The methods of the present invention begin before a query 132 is received by query handler 320 with the actions of document indexer 344. Document indexer 344 builds a document index 352 using web crawling and indexing technology. However, in addition to this conventional functionality, document indexer 344 includes novel program modules that further process documents in document index 352. For instance, document indexer 344 includes a "set of candidate terms constructor" 346. In a preferred embodiment, constructor 346 examines each document in document index 352. In other embodiments, only documents meeting predefined criteria (e.g., documents containing text in one of a predefined set of languages) are examined by the constructor 346.

For each document examined, constructor 346 determines whether the document includes any candidate terms embedded in the document. There are-many different ways in which constructor 346 can accomplish this task and all such methods are included within the scope of the present invention. In one embodiment, the task is accomplished by matching terms from the document with master list of candidate terms 342. Master list of candidate terms 342 includes all possible candidate terms. In some embodiments list 342 is a Unix style text file with a list of valid candidate terms. A representative format for list 342 is one candidate term per line, each candidate term in list 342 unique, UTF-8 encoded, with all commas, tabs, line ends, and @ symbols stripped. In some embodiments, the master list is restricted to nouns and noun phrases (the kinds of terms most likely to be useful as query terms), with any noun phrases of limited query refinement value explicitly removed.

In typical embodiments only a first portion of each document in document index 352 is examined for candidate terms. For example, in some instances only the first 100,000 bytes of each document in document index 352 is examined by constructor 346. In some embodiments, constructor 346 examines a document in document index 352 until a maximum number of terms (e.g., 100, 1000, 5000, etc.) in the document have been considered. In some embodiments, the search for candidate terms in a document is terminated when a threshold number of unique terms in the document have been found to occur within master list 342 (e.g., 1000 terms).

Some embodiments of the present invention provide more than one master list of candidate terms 342. Each master list 342 is optimized for a different language. For example, a first list 342 is optimized for English and a second list 342 is optimized for Spanish. Thus, the English list 342 will include informative terms that are found in English documents whereas the Spanish list 342 will include informative terms that are found in Spanish documents. Similarly, some embodiments of the present invention include lists that are optimized for French, German, Portuguese, Italian, Russian, Chinese, or Japanese. In some embodiments of the present invention, lists 342 are optimized for other types of categories. For example, in some embodiments, a list 342 is optimized to include scientific terms, fashion terms, engineering terms, or travel terms. However, in a preferred embodiment, each master list 342 is as inclusive as possible of informative terms. In fact, a master list 342 can include more than 10,000,000 terms, and typically includes significantly more than 1,000,000 terms. Each of these terms can be a word or a phrase. For clarity, a representative phrase is "Challenger Disaster."

Methods for determining the predominant language used in a document are well known in the art. Thus, in some embodiments of the present invention, constructor 346 uses such methods to (i) determine the language of the document being examined, and then (ii) use the master list 342 that is optimized for the same language as the document.

In the case where one or more candidate terms that are in master list 342 are embedded in an upper portion (e.g., in the first 100 kilobytes) of a document in index 352, the net result of the examination of the document by constructor 346 is the identification of such terms. When such terms are identified by constructor 346, they are added to a data structure associated with the document in a ranked form. This data structure is referred to as a set of candidate terms. After index 352 has been examined by constructor 346, each document in index 352 that has embedded candidate terms in their upper portions will be associated with a respective set of candidate terms that includes such terms. Thus, for example, if there are two documents, A and B, in index 352 that include candidate terms, a first set of candidate terms will be associated with document A and a second set of candidate terms will be associated with document B. The first set of candidate terms will include each candidate term that is embedded in an upper portion of document A and the second set of ranked candidate terms will include each term that is embedded in an upper portion of document B. In practice, each set of candidate terms is internally ranked to form a respective ranked set of candidate terms as disclosed in further detail below.

Figure 4:
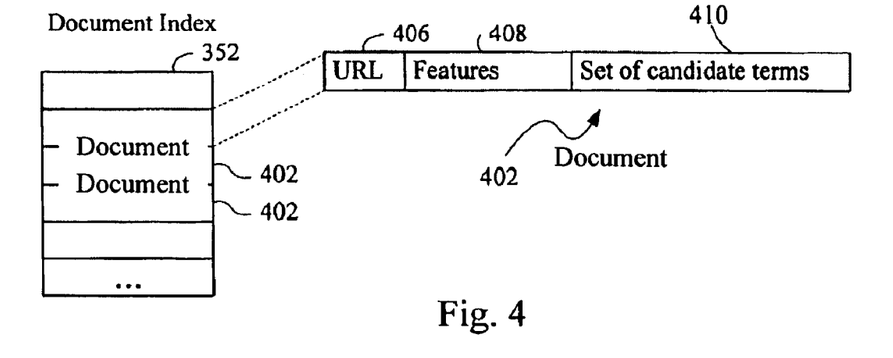
FIG. 4 is a block diagram of a search engine index.

FIG. 4 illustrates how examination of documents 402 in a document index 352 by constructor 346 results in a modification of document index 352. Before constructor 346 examined documents in index 352, each document 402 in index 352 includes the uniform resource location (URL) 406 of the document 402 as well as a set of feature values 408. The feature values 408 include metadata associated with the document, and include values that assist the search engine when ranking documents identified as being potentially relevant to a query. The feature values can include an indication of the file format of the document, the length of the document, the number of known inbound links (from other documents) to the document, the title of the document (e.g., for displaying when the document is selected as being responsive to a query), and so on. After a document 402 has been examined by the constructor 346 (FIG. 3), a set of candidate terms 410 is associated with the document 402.

In some embodiments of the present invention, the method by which a term in a document is matched with a candidate term in list 342 is done in such a manner that ensures that the term is matched with the most complex candidate term possible in list 342. To illustrate, consider the case where the term "A B" is embedded in a document in index 352, where A and B are each words. Further, assume that list 342 includes "A", "B", and "A B". When this arises, the term "A B" in the document will be matched with "A B" in list 342 and not "A" or "B". There are a number of ways in which such matching can be accomplished and all such matching schemes are within the scope of the present invention. One such matching approach uses a "greedy left to right algorithm" having the following logic:

for each sentence of the form 'A B C D . . . ' in the document examined:
    is A a prefix for a candidate term in list 342?
        Yes: Is 'A B' a prefix for a candidate term in list 342?
            Yes: Is 'A B C' a prefix for a candidate term in list 342?
                Yes →continue drilling through the sentence in like manner
                No: add 'A B' to the set of candidate terms 410 associated with the document and move to C and consider 'C D E F . . . '
            No: add 'A' to the set of candidate terms 410 associated with the document and move to B and consider 'B C D E . . . '
        No: move to B and begin consider 'B C D E . . . '

An algorithm such as this, where a "sentence" is some arbitrary amount of the document, such as a line, or the portion of document between two phrase boundaries or other break points, and 'A B C D . . . ' are each words in a term, ensures that the most complex term in list 342 is matched to a term in the document. In related approaches, constructor 346 discards a first candidate term in the set of candidate terms 410 when the first candidate term is a subset of a second candidate term in the set of candidate terms.

In some embodiments of the present invention, the number of times each candidate term in a set of ranked terms 410 appears in all or an upper portion (e.g., the first 100 kilobytes) of the document associated with the set 410 is tracked. For example, if the candidate term "A" in set 410 appears 12 times in the an upper portion of the document associated with set 410, then an indication that term "A" appears twelve times in the document in noted and used in a weighting scheme designed to determine which candidate terms will remain in the final set of ranked candidate terms.

In some embodiments, the indication of the number of times a term appears in the associated document is upweighted in each instance where the term appears within a first threshold number of words of the document. For instance, consider the case where the value of the first threshold is fifteen words. Further, in this exemplary case, the candidate term "A" appears exactly twice. The first appearance of phrase "A" is before the fifteen word limit and the second appearance of "A" is after the fifteen word limit. In the weighting scheme used in this exemplary case, words appearing within the first fifteen words receive twice as much weight. Thus, in the set of candidate terms 402 associated with the document, the candidate term "A" will be listed along with an indication that the term appears (2*1+1), or 3 times in an upper portion of the document. Those of skill in the art will appreciate that more complex forms of the first threshold are possible. For example, the weight applied to the candidate term count can be a function of the position of the candidate term in the document. For example, it could be a linear function (or a non-linear function, or a piecewise linear function) having a maximum at the beginning of the document and a minimum at the end of the document. Alternatively, the weight could be applied in baskets, where there is a large weight at the beginning of the document (first basket), a lower weight in a second portion of the document (second basket), an even lower weight in a third portion of the document (third basket), and so forth.

In embodiments where both (i) an indication of the number of times a candidate term appears in the associated document and (ii) constructor 346 discards a first candidate term in the set of ranked candidate terms 410 when the first candidate term is a subset of a second candidate term in the set of ranked candidate terms, the second candidate term is credited with the number of time the first candidate term was identified in the document by constructor 346.

In addition to constructor 346, indexer 344 includes redundancy filter 348. Filter 348 is designed to remove orthographic or inflectional variants that can end up in the set of candidate terms. An orthographic variant of a term has an alternative, correct spelling for the term. An inflectional variant of a term has an alternative suffix, or accented form of the term. In some embodiments, orthographic and/or inflectional variants are stored in variants list 360 (FIG. 3). The job of redundancy filter 348, then, is to ensure that no pair of candidate terms in the set of candidate terms 410 is in variants list 360. When a pair of candidate terms in the set of candidate terms 410 is in variants list 360, one term from the pair is discarded from set 410 by filter 348. In some embodiments, the first term in the pair will be effectively discarded from set 410 and a second term in the pair will be preserved. However, in some embodiments, the second term will be modified such that it is combined with the discarded first term. For example, if the terms A and B are inflectional or orthographic variants, one of the terms, say A, will be discarded and the other term, B, preserved. Further the term B will be rewritten as A,B. This feature is advantageous because it preserves useful information about the underlying document that can be used by higher level modules of the present invention such as the query refinement suggestion engine 324. Typically engine 324 will only present the first (nondiscarded) term in the case where such merged orthographic or inflectional variant candidate terms appear. For example, in the case of the rewritten term A,B, only the term "A" is included in the subset of candidate terms presented in panel 140. Typically the term that is discarded in a pair of terms appearing in list 360 is the term that appears less often in the associated document. In some embodiments, candidate terms that only differ by the absence or presence of certain noise words (e.g., a, the, who, what, where, etc.) are folded in the same manner as candidate terms that include orthographic or inflectional variants are folded together. Likewise, in some embodiments, in instances where the only differences between two terms in a given set of candidate terms is the presence or absence of punctuation, the two terms are folded together in the same manner that candidate terms that include orthographic or inflectional variants are folded together. In some embodiments, each phrase in the set of candidate terms is converted to the same case (e.g., lowercase). An exception to this rule is that those terms that are single words of six or fewer upper case characters are not converted to lower case because it is likely that such a term is an acronym.

In embodiments where both (i) an indication of the number of times a candidate term appears in the associated document and (ii) filter 348 discards a first candidate term in the set of candidate terms because it is an orthographic or inflectional variant of a second candidate term in the set, the second candidate term is credited with the number of time the first candidate term was identified in the document by constructor 346. In other words, when the only difference between two candidate terms is that one of the candidate terms includes a word that is an inflectional or orthographic variant of the corresponding word in the other candidate term, one of the candidate terms is discarded. An example of this arises in the case of the candidate terms "tow truck" and "tow trucks". In this example, the only difference between the two candidate terms is the recitation of "truck" in the first term and the recitation of "trucks" in the second term.

Figure 5:
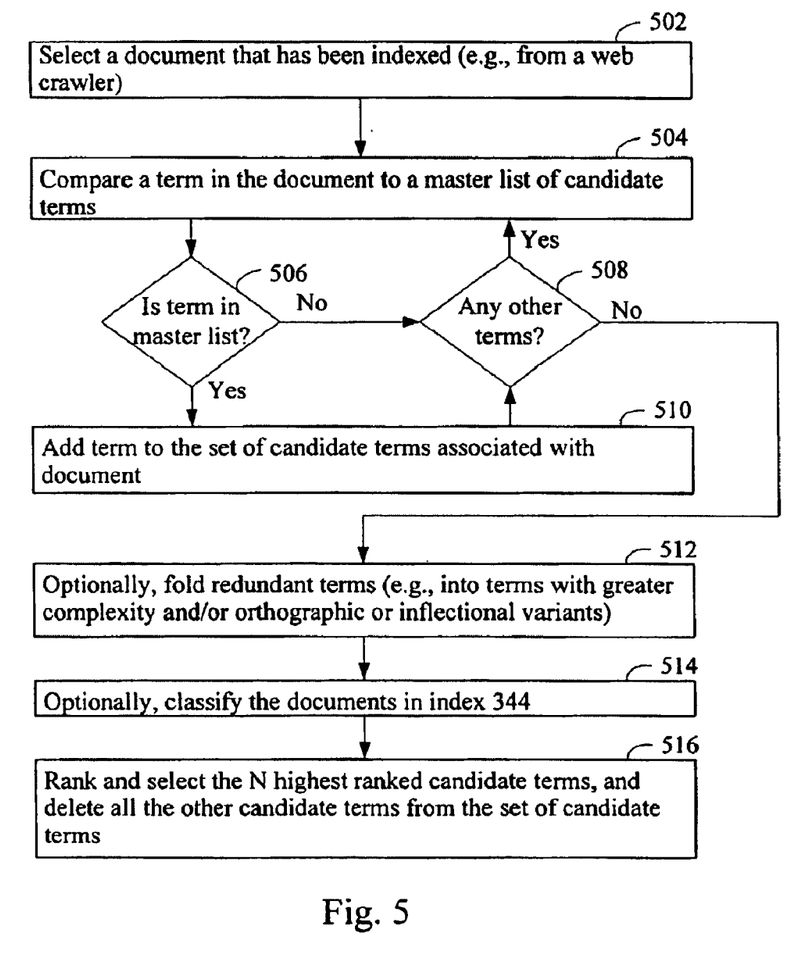
FIG. 5 is a flow chart of a document indexing method.

Many details about the document indexer 344 have been disclosed. At this stage it is instructive to review the flow diagram of FIG. 5, which discloses steps taken by some embodiments of indexer 344. After all or a portion of its other indexing duties (e.g., conventional indexing of the words in the documents found by a web crawler), indexer 344 passes control to constructor 346, which selects a document that has been indexed (FIG. 5, step 502).

In step 504, a term in the document is compared to a master list 342 of candidate terms. If the term is in the master list 342 (506-Yes), the term is added to the set of candidate terms 402 that is associated with the document (510). Note, that step 504 can involve more complex matching schemes such as the greedy left to right algorithm described above.

In some embodiments, the document to be compared is a web page. Therefore, some decisions must be made as to what constitutes a valid word suitable for comparison to master list 342. In one approach, a document that is, in fact, a web page is parsed to find text for phrase extraction. In one embodiment, phrase matching is performed in step 504 using all 'visible' text plus meta page descriptions, and such phrases do not include HTML code, java-script, etc. In order to derive valid phrases 'phrase boundaries' (e.g., table tags) within the web page are preserved such that an expression extracted from the document for comparison to list 342 does not span a phrase boundary. Additional examples of phrase boundaries that are used in some embodiments of the present invention include, but are not limited to punctuation like '.', '?', empty lines, etc.

In some embodiments of the present invention master list 342 is a very large set of terms that are gathered from several disparate sources. Therefore, in step 504 additional filtering can be performed to make sure that only informative candidate terms are selected for inclusion in a set of candidate terms. In some embodiments, the term in the document that is compared to terms in master list 342 is processed prior to the comparison. For example, in some embodiments, punctuation marks are removed from a term prior to comparison to list 342. In some embodiments, punctuation characters are replaced with a space prior to comparison to list 342. In some embodiments a list of noise terms 354 is stored in memory 314. Representative noise terms include, but are not limited to, words such as "a", "the", "who", "what", and "where." Thus, in embodiments in which a list of noise terms 354 is stored in memory 314, comparing step 504 will first determine whether a term to be compared with master list 342 is in the list of noise terms 354. If it is, then the term is ignored and it is not compared with list 342. In some embodiments, only those terms that contain at least a certain minimum threshold of characters is compared in step 504. For example, in some embodiments, only those terms that contain at least four characters are compared in step 504.

Regardless of the outcome of decision 506, a determination 508 is made as to whether any other terms in the document should be compared to master list 342 by constructor 346. Many different conditions that can be used to determine the outcome of decision 508 have been disclosed (e.g., maximum number of term cutoff, maximum number of unique term cutoff, maximum number of candidate terms already in set 410, etc.).

What follows in the flow chart in FIG. 5 are optional steps. In optional step 512, redundant terms are folded in the set of candidate terms associated with a document. In optional step 514, the document in index 352 are classified (e.g., into a first and second classes).

There are a number of different ways in which classification step 514 can be effected and all such ways are included within the scope of the present invention. For instance, in some embodiments, each document 402 is classified into a first or second class. In a preferred embodiment the first class is a family friendly class and the second class is a nonfamily friendly class. The document 402 will be classified into the second class when it includes sexually explicit, offensive, or violent language. Otherwise, it will be classified into the first class. In some embodiments, classifier module 350 (FIG. 3) is used to perform such a classification. Typically, classifier module 350 works by determining whether a document is intended to be sexually explicit, offensive, or to include violence. If so, the document is designated nonfamily friendly. This designation is stored in the feature values 408 (FIG. 4) that corresponds to the document that is associated with the classified set 410.

At this stage there are typically a large number of candidate terms in the set of candidate terms. For example, in embodiments where as many as 1000 candidate terms can be added to a set of candidate terms, the set of candidate terms can include 1000 terms at this stage. Regardless of the number of candidate terms in each candidate term set, they have not been ranked. Thus, in step 516 the candidate terms are ranked and then the N highest number of ranked candidate terms are allowed to remain in the candidate set and all other candidate terms are removed so as to keep only the N (e.g., 20) most representative terms in the ranked set (516). Thus, the net effect of step 516 is to produce a set of ranked candidate terms from the set of candidate terms. Further, in step 516, only top-ranked terms (e.g., the top 20) are allowed to remain in the set of ranked candidate terms.

Criteria or parameters used by the ranking function can include one or more of the following: the number of times each term appears in the document, whether the term appears in a predefined early portion of the document, the first position of the term in the document, and the number of characters in the term. Based on these parameters, a rank is assigned to each candidate term, and then only the N terms having the highest rank are retained in the set of ranked candidate terms. The other terms are deleted from the set.

Limiting the number of candidate terms associated with each document helps keep the document index from growing excessively large and reduces the quantity of terms that need to be considered at query-time, when speed of processing is paramount. The set of ranked candidate terms for a document can be associated with a document by storing in the document's index entry (see 410, FIG. 4) a set of strings (optionally compressed) or indices representing the candidate terms, where each index value points to the term in the master list of candidate terms 342. Related values can be stored in the document index 352 entry for a document, along with each candidate term (or a pointer to a candidate term) associated with the document, such as the term score used in the ranking process appears in the document and/or a first position of the term in the document. However, in a preferred embodiment, such additional values are not stored in document index 352.

The process by which sets of ranked candidate terms 410 are associated with documents in document index 352 has been described. Attention now turns to FIG. 6 which describes a way in which such sets 410 are used to construct a subset of candidate terms for presentation, in accordance with one embodiment of the invention. In step 602, a query is received by query handler 320. In step 604, the query is processed thereby retrieving an initial group of ranked documents from document index 352. It will be appreciated that, in some embodiments, the initial group of ranked documents can only contain indicia of the documents rather than the documents themselves. However, this indicia will include the uniform resource locator (URL) for each document in the initial set of documents. Therefore, each document can be retrieved from the Internet (or some other form of network) if subsequently requested by the user. In some embodiments, the initial set of documents is stored as search results 340 in memory 314 of server 300 (FIG. 3). Referring again to FIG. 6, a list of suggested query refinements (subset of candidate terms) is created (606) using search results 340.

The way in which a list of suggested query refinements (subset of candidate terms) is created will depend upon whether the query is a family friendly search. In optional step 608, a determination, for each top-ranked document (e.g., in the first fifty documents) in search results 340 (the initial group of ranked documents) is made of the classification of the document. When a threshold percentage of the top-ranked documents in search results 340 belong to a first classification (family friendly classification), all sets 410 of candidate terms associated with a top-ranked document that do not belong to the first classification are not used in any subsequent steps in FIG. 6. In some embodiments, classifications other than family friendly are used to classify documents during indexing (FIG. 5). In such embodiments, such classifications can be used in step 608 to determine which sets of ranked candidate terms will be used to construct the subset of candidate terms. In an exemplary embodiment, the classification of only the M top-ranked documents (e.g., the ten top ranked documents from the search results 340) is used to make the determination in step 608. For example, if at least eight of the ten top ranked documents is classified as being family friendly, then candidate terms from non-family friendly documents are excluded from the sets of ranked candidate terms used to create the list of suggested query refinements.

Figure 6:
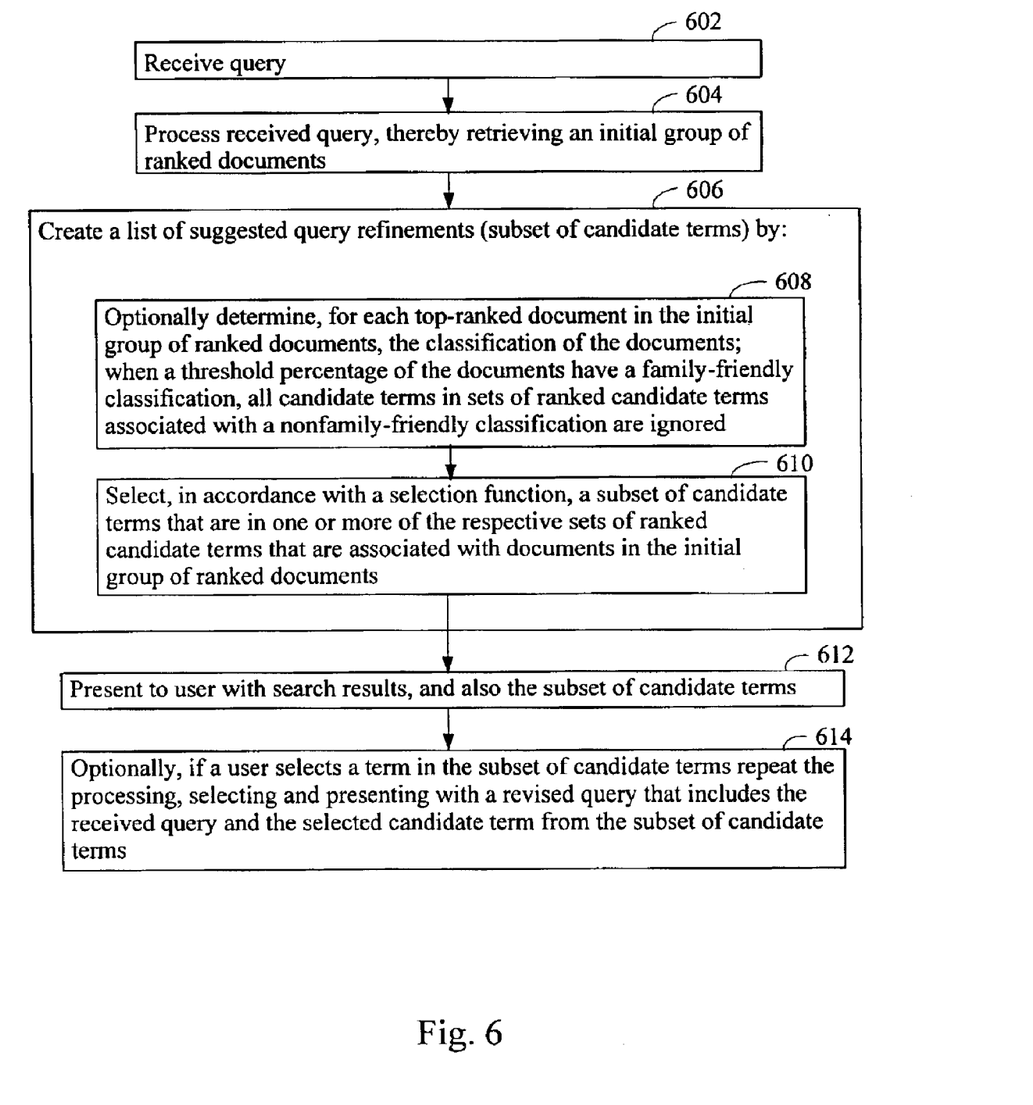
FIG. 6 is a flow chart of a procedure for processing a query submitted by a user.

In step 610, a subset of candidate terms that are in one or more of the respective sets of ranked candidate terms that are associated with documents in search results 340 are selected. In one embodiment, this selection function comprises applying a weighting function to each candidate term in each respective set of ranked candidate terms 410 that is associated with a top-ranked document in the initial group of ranked documents (search results 340). Each top-ranked document in the initial group of ranked documents has a ranking that is numerically less than a threshold ranking. In some embodiments, the top-ranked documents are the T top ranked documents, where T is a predefined number such as 50 (and is preferably in the range of 5 to 200, and is most preferably in the range of 20 to 100). Only top-ranked documents are considered in step 610 in order to maximize the chances of collecting relevant terms into the subset of candidate terms that is presented to the user. In various embodiments, only the top 5, 10, 15, 20, 50, or 100 documents are considered. Those candidate terms that receive the highest weight are included in the subset of candidate terms. In some embodiments, the number of terms in the subset of candidate terms is limited to a number less than 25.

In some embodiments, the subset of candidate terms is not built and no subset of candidate terms is presented to the user when there is fewer than a cutoff number of documents in the initial group of search results 340. For example, in one embodiment, the subset of candidate terms is not built if there are fewer than thirty-five documents in the initial group of search results 340.

The present invention provides a number of different weighting functions for scoring the candidate terms in each of the sets 410 associated with top-ranked documents in search results 340. These different weighting functions are used in various embodiments of selection function 324 of engine 322 (FIG. 3).

In some embodiments, the weight that is applied to a candidate term by function 324 (the weighting function) is determined in accordance with the number of sets of ranked candidate terms that both (i) include the candidate term and (ii) are respectively associated with a top-ranked document. For example, consider the case in which there are fifty top-ranked documents and the candidate term "Space Shuttle" appears in the three of the sets of ranked candidate terms respectively associated with a top-ranked document. In this case, a weight of three will be applied to the candidate term "Space Shuttle".

In some embodiments, the weight that is applied to a candidate term by selection function 326 is determined in accordance with a function (e.g., the average) of the candidate term in those sets of ranked candidate terms that both (i) include the candidate term and (ii) are respectively associated with a top-ranked document. Some embodiments consider both the sets that include the term and the sets that do not. The sets that do not include the term are assigned a numerical value for averaging that indicates that the term is not in the set. Such a weighing factor takes advantage of the fact that each set of ranked candidate terms is in fact a ranked order list. Thus, if the candidate term "Space Shuttle" appears at the top of the ranked list in many sets of candidate terms respectively associated with a top-ranked document, then it will receive a relatively high weight in this weighting scheme. Conversely, if the term "Space Shuttle" is among the last terms in each set of ranked candidate terms in which it appears, the term will receive a relatively low weight in this weighting scheme.

In some embodiments, the weight that is applied to a candidate term by function 324 is determined in accordance with whether a term in the received query is in the candidate term. For example, if the query term was "shuttle" and the candidate term is "space shuttle", the candidate term is given full weight, otherwise it is given no weight.

In some embodiments, the weight that is applied to a candidate term by function 324 (the weighting function) is determined in accordance with a number of characters in the candidate term. For example, the candidate term "Space Shuttle" will receive more weight than the candidate term "Dogs".

In some embodiments, the weight that is applied to a candidate term by function 324 is determined in accordance with a function (e.g., average) of the rank of those top-ranked documents that are associated with a set of ranked candidate terms that includes the candidate term. Such a weighting scheme exploits the ranking that has already been applied to the initial set of search results by search engine 322. In such weighting schemes, candidate terms from sets 410 associated with higher ranked documents are given precedence over candidate terms associated with lower ranked documents. For example, consider the case in which the candidate term "Space Shuttle" appears in the respective sets of ranked candidate terms associated with documents 2, 4, and 6 in the top-ranked documents in the initial group of ranked documents. Thus, in this weighting scheme, the term "Space Shuttle" will receive a weight that is a function of the value 4. Now suppose that the term "Space Shuttle" appears in the respective sets of ranked candidate terms associated with documents 10, 20, and 30 in the top-ranked documents in the initial group of ranked documents. Thus, in this weighting scheme, the term "Space Shuttle" will receive a weight that is a function of the value 20. Under this weighting scheme, the value 4 will produce a better weight (will up-weight the candidate term) relative to the weight produced with a value of 20. In some embodiments, the sets that do not include the candidate term are considered by this weighting function. They are assigned a numerical value for averaging.

In some embodiments the rank of the document in which the word first occurs as a candidate term is used in the weighting function.

Specific weighting factors that are used by various embodiments of selection function 326 have been outlined in order to introduce such factors. However, in preferred embodiments, several such factors are combined in order to produce desirable results. What follows are some preferred embodiments of selection function 326.

In some embodiments, the weight that is applied to a candidate term by function 324 is determined in accordance with any combination (or any weighted combination) of TermCount, TermPosition, ResultPosition, TermLength, and QueryInclusion, where TermCount is the number of sets of ranked candidate terms that both (i) include the candidate term and (ii) are respectively associated with a top-ranked document, TermPosition is a function (e.g., average) of the position of the candidate term in those sets of ranked candidate terms that both (i) include the candidate term and (ii) are respectively associated with a top-ranked document, ResultPosition is a function (e.g., average) of the rank of those top-ranked documents that are associated with a set of ranked candidate terms that includes the candidate term, TermLength is a number of characters in the candidate term (candidate term complexity), and QueryInclusion is a value that indicates whether a term in the received query is in the candidate term.

As used herein, application of QueryInclusion (e.g., when QueryInclusion is a non-zero value such as 1), means that the candidate term is upweighted when a term in the received query is in the candidate term. Further, nonapplication of QueryInclusion (e.g., when QueryInclusion is set equal to zero) means that the candidate term is not upweighted when a term in the received query is not in the candidate term. In some embodiments a candidate term is not credited for noise terms (e.g., a, the, who, what, where, etc.). Thus if the query includes the noise word "for" and the candidate term includes the word "for", credit is not given to the candidate term and QueryInclusion is not upweighted.

In some embodiments, the weight that is applied to a candidate term by function 324 is determined in accordance with the formula:

TermCount+TermPosition+ResultPosition+TermLength+QueryInclusion.

where the weights, TermCount, TermPosition, ResultPosition, TermLength, and QueryInclusion are as defined above. In some embodiments, TermCount, TermPosition, ResultPosition, TermLength, and QueryInclusion are each independently weighted.

In some embodiments, the weight that is applied to a candidate term by function 324 is determined in accordance with the formula:

(TermCount*$w_1$)+(TermPosition*($w_2$+(RefinementDepth*$w_2$')))+
(ResultPosition*$w_3$)+(TermLength*($w_4$+
(RefinementDepth*$w_4$')))+(QueryInclusion*($w_5$+
(RefinementDepth*$w_5$')))

where $w_1$, $w_2$, $w_3$, $w_4$, $w_5$, $w_2'$, $w_4'$, and $w_5'$ are independent weights. Further, RefinementDepth is a number of times the processing has been performed for the received query. In other words, RefinementDepth is the number of times steps 602 through 612 have been repeated by operation of execution of optional step 614 in which a user add a term from the subset of candidate terms to the original search query. In one embodiment $w_1$=100

$w_2$=15

$w_2'$=15

$w_3$=1

$w_4$=1

$w_4'$=0

$w_5$=100, and $w_5'$=50.

In some embodiments of the present selection function 610 will remove certain candidate terms in sets of ranked candidate terms. For example, in some embodiments, candidate terms in the set of ranked candidate terms that only differ by a certain prefix or suffix are folded together. For example, in some embodiments, a list of prefixes and a list of suffixes are stored in memory 314. If the only difference between two candidate terms is that one of the candidate terms includes a word that differs by a prefix at the start of a word or a suffix at the end of the word relative to the corresponding word in the other candidate term, the two candidate terms are folded together. In some embodiments, there are three classes of prefixes (and three analogous classes of suffixes). If a candidate term includes a prefix belonging to the first class, the word is discarded. If a candidate term includes a prefix that belongs to the second class, the prefix is removed. If a candidate term includes a prefix that belongs to a third class, an evaluation is performed. In this evaluation, each of the sets of ranked candidate terms associated with a top-ranked document is searched for an instance of the same term that does not include the prefix. If no such instance is found, then the prefix is not stripped. If such an instance is found then the prefix is stripped. This type of prefix (and suffix) processing is useful in many instances. For example, consider the case in which a candidate term is "the cars". Ordinarily, the prefix "the" is considered a prefix that should be stripped. However, is could be that the candidate term is referring to a famous musical group that is typically referenced by the name "the cars". Thus, a search ensues to see if the term "cars" without the prefix "the" is found in any of the other sets of ranked candidate terms associated with a top-ranked document. If no such instance appears, then the prefix is not stripped. In this example, it is noted that, as used here, a prefix can be a preceding affix (e.g., un-, non-, etc.) or a preceding word or phrase (e.g., the, of, to go, etc.).

In step 612, the subset of candidate terms is presented to the user. In step 614, the user optionally selects a term 136 (FIG. 2) in the subset of candidate terms and the processing (step 604), selecting (step 606) and presenting (step 612) are repeated with a revised query that includes the original (received) query and the selected candidate term 136 from the subset of candidate terms that was displayed in panel 140 (FIG. 2). As explained above, in some embodiments the user may select a term 136 for addition to the previously submitted query, for replacement of the previously submitted query, or for use as an exclusionary term in conjunction with the previously submitted query.

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain the program modules shown in FIG. 3. These program modules can be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method of refining a received query, comprising processing said received query so as to generate an initial group of ranked documents corresponding to the received query, wherein each document in all or a portion of the documents in said initial group of ranked documents is associated with a respective set of precomputed ranked candidate terms such that each candidate term in said respective set of ranked candidate terms is embedded within said document; selecting, in accordance with a selection function, a subset of candidate terms that are in one or more of said respective sets of ranked candidate terms; an presenting, in response to the received query, the initial group of ranked documents and said subset of candidate terms.

2. The method of claim 1 wherein, for all or a portion of the top-ranked documents in said initial group of ranked documents, the respective set of ranked candidate terms associated with said document is identified by: (A) comparing a term in said document to a master list of candidate terms, wherein, when said term is in said master list of candidate terms, said term is added to a set of candidate terms; (B) repeating said comparing number of times; and (C) ranking said candidate terms in said set of candidate terms, thereby forming said respective set of ranked candidate terms.

3. The method of claim 2 wherein, for all or a portion of the respective top-ranked documents in said initial group of ranked documents, a classification of the document is included with said respective set of ranked candidate terms associated with said document, wherein said classification comprises a first classification or a second classification.

4. The method of claim 3 wherein said selection function comprises: determining, for each respective set of ranked candidate terms associated with a top-ranked document in said initial group of ranked documents, said classification of said associated top-ranked document; and when a threshold percentage of said associated top-ranked documents evaluated in said determining belong to said first classification, all sets of candidate terms that are associated with a document belonging to said second classification are not used to form said subset of candidate terms.

5. The method of claim 2 wherein, for all or a portion of the top-ranked document in said initial group of ranked documents, a number of times a candidate term is identified by an instance of said comparing (A) is used by said ranking (C) to rank said candidate term in said set of ranked candidate terms.

6. The method of claim 5 wherein said ranking (C) further uses a first position of said candidate term in the respective associated document to rank said candidate term.

7. The method of claim 5, the identification further comprising: (C) discarding a first candidate term when said first candidate term is a subset of a second candidate term in said respective set of candidate terms; (D) crediting said second candidate term with a number of times said first candidate term was identified in said document associated with said respective set of ranked candidate terms by instances of said comparing (A); and (E) repeating said discarding (C) and said crediting (D) until there is no first candidate term that is a subset of a second candidate term in said respective set of ranked candidate terms.

8. The method of claim 5, the identification further comprising: (C) discarding a first candidate term when said first candidate term is an orthographic or inflectional variant of a second candidate term in said respective set of ranked candidate terms; (D) crediting said second candidate term with a number of times said first candidate term as identified in said document associated with said respective set of ranked candidate terms by instance of said comparing (A); and (E) repeating said discarding (C) and said crediting (D) until there is no first candidate term that is an orthographic or inflectional variant of a second candidate term in said respective set of ranked candidate terms.

9. The method of claim 8 wherein said crediting said second candidate term (D) further comprises: rewriting said second candidate term as a combined term that includes said first candidate term and said second candidate term, wherein the one of said first candidate term or said second candidate term identified by an instance of said comparing (A) the most times appears at the beginning of said combined term.

10. The method of claim 9 wherein only the term appearing at the beginning of said combined term is used in said presenting.

11. The method of claim 2 wherein, for all or a portion of the top-ranked documents in said initial group of ranked documents, the respective set of ranked candidate terms associated with the document includes, for each candidate term in said respective set, a first position of said candidate term in said document.

12. The method of claim 2 wherein said identification further comprises: (C) terminating said comparing (A) and terminating said repeating (B) when a threshold number of unique terms have been considered by said comparing (A).

13. The method of claim 2 wherein said master list of candidate terms is optimized for a specific language.

14. The method of claim 13 wherein said specific language is English, Spanish, French, German, Portuguese, Italian, Russian, Chinese, of Japanese.

15. The method off claim 13 wherein all of a portion of the top-ranked documents in said initial group off ranked documents are in the same language for which said master list off candidate terms is optimized.

16. The method off claim 2 wherein each term in said master list off candidate terms is a word of a phrase.

17. The method off claim 2 wherein said master list off candidate terms comprises more than 1,000,000 terms.

18. The method of claim 1 wherein each said respective set of ranked candidate terms is identified at a time prior to said processing said received query.

19. The method off claim 1, the method further comprising repeating said processing, selecting, and presenting using a revised query that includes said received query and a candidate term from said subset off candidate terms.

20. The method off claim 1 wherein said selection function comprises: (i) applying a weighting function to each candidate term in each respective set ranked candidate terms that is associated with a top-ranked document in said initial group off ranked documents, wherein each top-ranked document in said initial group off ranked documents has a ranking that is numerically less than a threshold ranking; and (ii) selecting, for said subset of candidate terms, those candidate terms receiving a highest weight.

21. The method of claim 20 wherein a weight that is applied to a candidate term by said weighting function is determined in accordance with a the number off sets off ranked candidate terms that both (i) include the candidate term and (ii) are respectively associated with a top-ranked document.

22. The method off claim 20 wherein a weight that is a applied to a candidate term by said weighting function is determined in accordance with the average position off the candidate term in those sets off ranked candidate terms that both (i) include the candidate term and (ii) are respectively associated with a top-ranked document.

23. The method off claim 20 wherein a weight that is a applied to a candidate term by said weighting function is determined in accordance with whether a term in said received query is in said candidate term.

24. The method off claim 20 wherein a weight that is applied to a candidate term by said weighting function is determined in accordance with a number of characters in said candidate term.

25. The method off claim 20 wherein a weight that is applied to a candidate term by said weighting function is determined in accordance with the average rank off those top-ranked documents that are associated with a set off ranked candidate terms that includes the candidate term.

26. The method off claim 20 wherein a weight that is a applied to a candidate term by said weighting function is determined in accordance with any combination of TermCount, TermPosition, ResultPosition, TermLength, and QueryInclusion, where TermCount is a number off sets off ranked candidate terms that both (i) include the candidate term and (ii) are respectively associated with a top-ranked document, TermPosition is a function of the rank position off the candidate term in those sets of ranked candidate terms that both (i) include the candidate term and (ii) are respectively associated with a top-ranked document, ResultPosition is a function off the rank off those top-ranked documents that are associated with a set off ranked candidate terms that includes the candidate term, TermLength is a number of characters in the candidate term (candidate term complexity), and QueryInclusion is a value that indicates whether a term in the received query is in the candidate term.

27. The method off claim 26 wherein a weight that is applied to a candidate term by said weighting function is determined in accordance with the formula:

$$TermCount + TermPosition + ResultPosition + TermLength + QueryInclusion.$$

28. The method off claim 27 wherein TermCount, TermPosition, ResultPosition, TermLength, and QueryInclusion are each independently weighted.

29. The method off claim 26, the method further comprising optionally repeating said processing, selecting, and presenting using a revised query that includes said received query and a candidate term from said subset of candidate terms.

30. The method of claim 29 wherein a weight that is applied to a candidate term by said weighting function is determined in accordance with the formula:

$$(TermCount*w_1) + (Term\ Position*(w_2 + (RefinementDepth*w_2'))) + (ResultPosition*w_3) + (TermLength*(w_4 + (RefinementDepth*w_4'))) + (QueryInclusion*(w_5 + (RefinementDepth*w_5')))$$

where $w_1$, $w_2$, $w_3$, $w_4$, $w_5$, $w_2'$, $w_4'$, and $w_5'$ are independent weights and RefinementDepth is a number of times said processing has been performed for said received query.

31. A computer program product for use in conjunction with a computer system, the computer program product comprising a computer readable storage medium and a computer program mechanism embedded therein, the computer program mechanism comprising: an query refinement suggestion engine for refining a received query, comprising: instructions for processing said received query so as to generate an initial group of ranked documents corresponding to the received query, wherein each document in all of a portion of the documents in said initial group of ranked documents is associated with a respective set of precomputed ranked candidate terms such that each candidate term in said respective set of ranked candidate terms is embedded within said document; instructions for selecting, in accordance with a selection function, a subset of candidate terms that are in one of more of said respective sets of candidate terms; and instructions for presenting, in response to the received query, the initial group of ranked documents and said subset of candidate terms.

32. The computer program product of claim 31 wherein, for all of a portion of the top-ranked documents in said initial group of ranked documents, the respective set of ranked candidate terms associated with said document is identified by: (A) instructions for comparing a term in said document to a master list of candidate terms, wherein, when said term is in said master list of candidate terms, said term is added to said respective set of ranked candidate terms associated with said document as a candidate term; and (B) instructions for re-executing said instructions for comparing until a maximum number of terms in said document has been considered.

33. The computer program product of claim 32 wherein, for all of a portion of the top-ranked documents in said initial group of ranked documents, a classification of the candidate terms in the respective set of ranked candidate terms associated with said document is included within said respective set of ranked candidate terms associated with said document, wherein said classification comprises a first classification or a second classification.

34. The computer program product of claim 33 wherein said selection function comprises: instructions for determining, for each respective set of ranked candidate terms associated with a top-ranked document in said initial group of ranked documents, said classification of said respective set of ranked candidate terms; and when a threshold percentage of said sets of candidate terms evaluated in said determining belong to said first classification, all sets of candidate terms that belong to said second classification are not used to form said subset of candidate terms.

35. The computer program product of claim 32 wherein, for all or a portion of the top-ranked documents in said initial group of ranked documents, a number of times a candidate term is identified by an instance of said instructions for comparing (A) is included in said respective set of ranked candidate terms associated with said document.

36. The computer program product of claim 35 wherein said number of times said candidate term is identified by an instance of said instructions for comparing (A) is upweighted when said candidate term is identified within a first threshold number of words in said document.

37. The computer program product of claim 35, the identification further comprising: (C) instructions for discarding a first candidate term when said first candidate term is a subset of a second candidate term in said respective set of ranked candidate terms; (D) instructions for crediting said second candidate term with a number of times said first candidate term was identified in said document associated with said respective set of ranked candidate terms by instances of said comparing (A); and (E) instructions for repeating said instructions for discarding (C) and said instructions for crediting (D) until there is no first candidate term that is a subset of a second candidate term in said respective set of ranked candidate terms.

38. The computer program product of claim 35, identification further comprising: (C) instructions for discarding a first candidate term when said first candidate term is an orthographic of inflectional variant of a second candidate term in said respective set of ranked candidate terms; (D) instructions for crediting said second candidate term with a number of times said first candidate term was identified in said document associated with said respective set of ranked candidate terms by an instance of said comparing (A); and (E) instructions for repeating said instructions for discarding (C) and said instructions for crediting (D) until there is no first candidate term that is an orthographic of inflectional variant of a second candidate term in said respective set of ranked candidate terms.

39. The computer program product 38 wherein said instructions for crediting said second candidate term (D) further comprise: instructions for rewriting said second candidate term as a combined term that includes said first candidate term and said second candidate term, wherein the one of said first candidate term or said second candidate term identified by an instance of said instructions for comparing (A) the most times appears at the beginning of said combined term.

40. The computer program product of claim 39 wherein only the term appearing at the beginning of said combined term is used by said instruction for presenting.

41. The computer program product of claim 32 wherein, for all of a portion of the top-ranked documents in said initial group of ranked documents, the respective set of ranked candidate terms associated with the document includes, for each candidate term in said respective set, an average position of said candidate term in said document.

42. The computer program product of claim 41 wherein the average position of said candidate term in said document is determined in accordance with the averaging the position of each instance of the candidate term identified during an instance of said instructions for comparing (A).

43. The computer program product of claim 32 wherein said identification further comprises: (C) instructions for terminating said instructions for comparing (A) and instructions for terminating said instructions for repeating (B) when a threshold number of unique terms have been considered by said instructions for comparing (A).

44. The compute program product of claim 32 wherein said master list of candidate terms is optimized for a specific language.

45. The computer program product of claim 44 wherein each document in all of a portion of the documents in said initial group of ranked documents are in the same language for which said master list of candidate terms is optimized.

46. The computer program product of claim 32 wherein each term in said master list of candidate terms is a word of a phrase.

47. The computer program product of claim 32 wherein each said respective set of ranked candidate terms is identified at a time prior to said processing said received query.

48. The computer program product of claim 31, wherein said query refinement suggestion engine further comprises instructions for repeating said instructions for processing, instructions for selecting, and instructions for presenting using a revised query that includes said received query and a candidate term from said subset of candidate terms.

49. The computer program product of claim 31 wherein said selection function comprises: (i) instructions for applying a weighting function to each candidate term in each respective set of ranked candidate terms that is associated with a top-ranked document in said initial group of ranked documents, wherein each top-ranked document in said initial group of ranked documents has a ranking that is numerically less than a threshold ranking; and (ii) instructions for selecting, for said subset of candidate terms, those candidate terms receiving a highest weight.

50. The computer program product of claim 49 wherein a weight that is applied to a candidate term by said weighting function is determined in accordance with a number of times said candidate term appears in an upper portion of top-rank document.

51. The computer program product of claim 49 wherein a weight that is applied to a candidate term by said weighting function is determined in accordance with a position of said candidate term in a top-ranked document in which said candidate term appears.

52. The computer program product of claim 49 wherein a weight that is applied to a candidate term by said weighting function is determined in accordance with whether a term in said received query is in said candidate term.

53. The computer program product of claim 49 wherein a weight that is applied to a candidate term by said weighting function is determined in accordance with a number of characters in said candidate term.

54. The computer program product of claim 49 wherein a weight that is applied to a candidate term by said weighting function is determined in accordance with a position of a document in said initial group of ranked documents that include said candidate term.

55. The computer program product of claim 49 wherein a weight that is applied to a candidate term by said weighting function is determined in accordance with any combination of TermCount, TermPosition, ResultPosition, TermLength, and QueryInclusion, where TermCount is a number of times said candidate term appears in an upper portion of each top-ranked document, TermPosition is a function of the position of said candidate term within each top-ranked document in which said candidate term appears, ResultPosition is a function of the position of documents in top-ranked documents, in the initial group of ranked documents, that include the candidate term, TermLength is a number of characters in said candidate term, and QueryInclusion not zero when a term in said received query is in said candidate term and QueryInclusion is zero when a term in said received query is not in said candidate term.

56. The computer program product of claim 55 wherein a weight that is applied to a candidate term by said weighting function is determined in accordance with the formula:

$$TermCount+TermPosition+ResultPosition+TermLength+QueryInclusion.$$

57. The computer program product of claim 56 wherein TermCount, TermPosition, ResultPosition, TermLength, and QueryInclusion are each independently weighted.

58. A computer system for refining a received query, the computer system comprising: a central processing unit; a memory, coupled to the central processing unit, the memory storing an query refinement suggestion engine comprising: instructions for processing said received query so as to generate an initial group of ranked documents corresponding to the received query, wherein each document in all or a portion of the documents in said initial group of ranked documents is associated with a respective set of precomputed ranked candidate terms such that each candidate term in said respective set of ranked candidate term is embedded within said document; instructions for selecting, in accordance with a selection function, a subset of candidate terms that are in one or more of said respective sets of candidate terms; and instructions for presenting, in response to the received query, the initial group of ranked documents and said subset of candidate terms.

59. The computer system claim 58 wherein, for all or a option of the top-ranked documents in said initial group of ranked documents, the respective set of ranked candidate terms associated with said document is identified by: (A) instructions for comparing a term in said document to a master list of candidate terms, wherein, when said term is in said master list of candidate terms, said term is added to said respective set of ranked candidate terms associated with said document as a candidate term; and (B) instructions for re-executing said instructions for comparing until a maximum number of terms in said document has been considered.

60. The computer system of claim 59 wherein, for all of a portion of the top-ranked documents in said initial group of ranked documents, a classification of the candidate terms in the respective set of ranked candidate terms associated with said document is included within said respective set of ranked candidate terms associated with said document, wherein said classification comprises a first classification of a second classification.

61. The computer system of claim 60 wherein said selection function comprises: instructions for determining, for each respective set of ranked candidate terms associated with a document in said initial group of ranked documents, said classification of said respective set of ranked candidate terms; and when a threshold percentage of said sets of candidate terms evaluated in said determining belong to said first classification, all sets of candidate terms that belong to said second classification are not used to form said subset of candidate terms.

62. The computer system of claim 59 wherein, for all of a portion of the top-ranked documents in said initial group of ranked documents, a number of times a candidate term is identified by an instance of said instructions for comparing (A) is included in said respective set of ranked candidate terms associated with said document.

63. The computer system of claim 62, the identification further comprising: (C) instructions for discarding a first candidate term when said first candidate term is a subset of a second candidate term in said respective set of ranked candidate terms; (D) instructions for crediting said second candidate term with a number of times said first candidate term was identified in said document associated with said respective set of ranked candidate terms by instances of said comparing (A); and (E) instructions for repeating said instructions for discarding (C) and said instructions for crediting (D) until there is no first candidate term that is a subset of a second candidate term in said respective set of ranked candidate terms.

64. The computer system of claim 63 wherein said selection function comprises: (i) instructions for applying a weighting function to each candidate term in each respective set of ranked candidate terms that is associated with a top-ranked document in said initial group of ranked documents, wherein each top-ranked document in said initial group of ranked documents has a ranking that is numerically less than a threshold ranking; and (ii) instructions for selecting, for said subset of candidate terms, those candidate terms receiving a highest weight.

65. The computer system of claim 64 wherein a weight that is applied to a candidate term by said weighting function is determined in accordance with any combination of TermCount, TermPosition, ResultPosition, TermLength, and QueryInclusion, where TermCount is a number of times said candidate term appears in an upper portion of each top-ranked document, TermPosition is a function of the position of said candidate term within each top-ranked document in which said candidate term appears, ResultPosition is a function of the position of documents in top-ranked documents, in the initial group of ranked documents, that include the candidate term, TermLength is a number of characters in said candidate term, and QueryInclusion is applied when a term in said received query is in said candidate term and QueryInclusion is not applied when a term in said received query is not in said candidate term.

66. The computer system of claim 65 wherein a weight that is applied to a candidate term by said weighting function is determined in accordance with the formula:

$$TermCount+TermPosition+ResultPosition+TermLength+QueryInclusion.$$

67. The computer system of claim 66 wherein TermCount, TermPosition, ResultPosition, TermLength, and QueryInclusion are each independently weighted.

68. The computer system of claim 62, the identification further comprising: (C) instructions for discarding a first candidate term when said first candidate term is an orthographic of inflectional variant of a second candidate term in said respective set of ranked candidate terms; (D) instructions for crediting said second candidate term with a number of times said first candidate term was identified in said document associated with said respective set of ranked candidate terms by an instance of said comparing (A); and (E) instructions for repeating said instructions for discarding (C) and said instructions for crediting (D) until there is no first candidate term that is an orthographic of inflectional variant of a second candidate term in said respective set of ranked candidate terms.

69. The computer system of claim 59 wherein, for all or a portion of the top-ranked documents in said initial group of ranked documents, the respective set of ranked candidate terms associated with the document includes, for each candidate term in said respective set, an average position of said candidate term in said document.

70. The computer system of claim 59 wherein said identification further comprises: (C) instructions for terminating said instructions for comparing (A) and instructions for terminating said instructions for repeating (B) when a threshold number of unique terms have been considered by said instructions for comparing (A).

71. The computer system of claim 58, wherein said query refinement suggestion engine further comprises instructions for repeating said instructions for processing, instructions for selecting, and instructions for presenting using a revised query that includes said received query and a candidate term from said subset of candidate terms.

72. The computer system of claim 58, wherein each said respective set of ranked candidate terms is identified at a time prior to said processing said received query.

73. A document index data structure comprising a plurality of uniform resource locators (URLs), each URL designating a respective document; wherein each document in all of a portion of the respective documents designated by said plurality of URLs is associated with a respective set of ranked candidate terms, wherein each candidate term in a respective set of ranked candidate terms comprises candidate terms that are embedded in the document associated with said set of ranked candidate terms.

74. The data structure of claim 73 wherein a respective set of ranked candidate terms is created by (A) comparing a term in the document associated with said respective set of ranked candidate terms to a master list of candidate terms, wherein, when said term is in said master list of candidate terms, said term is added to said respective set of ranked candidate terms as a candidate term; and (B) repeating said comparing until a maximum number of terms in said document has been considered.

75. The data structure of claim 74 wherein each said respective set of ranked candidate terms includes a first classification of a second classification and wherein inclusion of said first classification of a second classification in said respective set of ranked candidate terms is determined in accordance with an identity of one or more candidate terms in said respective set of ranked candidate terms.

* * * * *